United States Patent
Buta

(10) Patent No.: US 8,529,172 B2
(45) Date of Patent: Sep. 10, 2013

(54) EDGE MILLING DEVICE

(76) Inventor: John R. Buta, Salem, OH (US)

(*) Notice: Subject to any disclaimer, the term of this patent is extended or adjusted under 35 U.S.C. 154(b) by 1087 days.

(21) Appl. No.: 12/488,276

(22) Filed: Jun. 19, 2009

(65) Prior Publication Data

US 2009/0317204 A1  Dec. 24, 2009

Related U.S. Application Data

(60) Provisional application No. 61/074,284, filed on Jun. 20, 2008.

(51) Int. Cl.
*B23C 1/12* (2006.01)

(52) U.S. Cl.
USPC ........... 409/132; 409/138; 409/157; 409/211; 409/228

(58) Field of Classification Search
USPC ............ 409/131, 132, 138, 139, 140, 157, 409/158, 169, 201, 202, 203, 211, 212, 213, 409/217, 228, 229; 408/46, 49, 53; 407/34; 83/446, 449
IPC ........................................ B23C 1/08, 1/12, 3/12
See application file for complete search history.

(56) References Cited

U.S. PATENT DOCUMENTS

| | | | | |
|---|---|---|---|---|
| 1,292,157 A | * | 1/1919 | Townsend | 409/138 |
| 3,785,247 A | * | 1/1974 | Ohno et al. | 409/138 |
| 3,791,258 A | * | 2/1974 | Krall et al. | 409/139 |
| 3,945,283 A | * | 3/1976 | Zemek et al. | 83/278 |
| 4,197,043 A | * | 4/1980 | Houghton | 409/139 |
| 4,255,999 A | * | 3/1981 | Davis | 83/367 |
| 4,268,261 A | * | 5/1981 | Kohmann et al. | 493/231 |
| 4,616,966 A | * | 10/1986 | Ohyama | 409/138 |
| 5,685,670 A | | 11/1997 | Satran | |
| 5,921,729 A | * | 7/1999 | Kikuchi et al. | 409/138 |
| 6,749,375 B2 | | 6/2004 | Thomas | |
| 7,186,063 B2 | | 3/2007 | Volokh | |
| 7,234,980 B2 | | 6/2007 | Jazowski et al. | |
| 7,241,082 B2 | | 7/2007 | Smilovici et al. | |
| 7,281,885 B2 | | 10/2007 | Obkircher et al. | |
| 7,306,409 B2 | * | 12/2007 | Stabel et al. | 407/113 |
| 7,306,412 B2 | | 12/2007 | Masuyama | |
| 7,313,992 B2 | | 1/2008 | Hall | |
| 7,360,975 B2 | | 4/2008 | Hall | |
| 7,367,753 B2 | | 5/2008 | Maurer | |
| 2008/0095589 A1 | | 4/2008 | Kammermeier et al. | |

* cited by examiner

*Primary Examiner* — Daniel Howell
*Assistant Examiner* — Michael Vitale
(74) *Attorney, Agent, or Firm* — Fay Sharpe LLP

(57) ABSTRACT

An edge milling cutter assembly for cutting opposite edges of a workpiece, has a first cutting assembly; a second cutting assembly positioned a predetermined distance from the first cutting assembly; a first guide roll assembly positioned in front of the first cutting assembly; a second guide wall assembly positioned in front of the second cutting assembly; wherein the first guide roll assembly and the second guide roll assembly are movable in relation to each other in equal distances; and a mechanism which engages the first guide roll assembly and the second guide roll assembly to facilitate equal movement of each of the guide rolls in such a manner that the first and second cutting assemblies cut equal amounts of material from opposite edges of the workpiece.

15 Claims, 9 Drawing Sheets

EDGE MILLING DEVICE

CLAIM OF PRIORITY

This application claims priority from U.S. Provisional Application Ser. No. 61/074,284 filed on Jun. 20, 2008, which is hereby incorporated by reference.

BACKGROUND OF THE DISCLOSURE

The present disclosure relates to a rotary milling cutter such as an end mill to be used for milling workpieces such as metals and the like to be rolled into tubing and other applications, and a milling method using the same.

Milling cutters are typically rotatable tools of cylindrical, conical, or disk form, having a plurality of cutting edges. Such cutters are available in many forms, such as plain cylindrical, side milling cutters, face and end mills, formed cutters, and standard and special shaped profile cutters. High speed steel cutters are used for short production runs and carbide cutters are often used for long runs. One form of a cutting insert is described in U.S. Pat. No. 5,685,670 hereby incorporated by reference. Similarly, for lathe tools, each cutting edge has a clearance angle which is always positive, and a rake angle which is often positive, but may be zero or negative, for example when the cutter tooth is made of a hard grade of tungsten carbide and machining is carried out at high speeds yet without a coolant. Also similar to lathe tools, the recommended relief angles depend on the material to be machined and the material of which the cutter is made.

Conventionally, in the field of milling of metals, a rotary milling cutter such as an end mill that performs milling by rotating about a rotation axis has been used for fabricating tubes or pipes from sheet metal. Such a rotary milling cutter is provided with a cutting edge at its distal portion or at a side of the distal portion, and is capable of milling by rotating about the rotation axis. An example of a conventional rotary milling cutter is shown in FIG. 1. When a metal block is milled to a predetermined depth, the size of each angle R coincides with the diameter of the cutter C.

A strip of material runs through the milling cutter to be rolled or formed into pipe or tubing. As such, the opposite edges need to be milled to have clean, precise edges. In current milling cutters, the mill contacts the strip and remains stationary. Rotary milling methods that use a conventional end mill have other problems as well. For example, existing end milling devices do not compensate for floating of a workpiece through the mill; thus, an equal amount of material is not removed from each end of the sheet. Accordingly, it is desired to provide an edge milling device which removes equal amounts of material from each edge, regardless of the amount of float of the sheet through the mill.

SUMMARY OF THE DISCLOSURE

The present disclosure relates to milling or cutting edges of metal plate. More particularly, it relates to an edge milling device which mills edges on both sides of a metal strip to be formed and welded into pipe or tubing.

It is an object of the present disclosure to provide an edge milling cutter and a milling method using the same, in which it is possible to mill opposite edges of a metal sheet or workpiece to result in a precise width, and an equal amount of material width is removed from each edge of the metal strip, even if the metal strip floats as it passes through the milling device. The width of the strip desired can vary, and even small widths can be achieved by taking equal amounts off of end sides of the plate or sheet.

In accordance with an aspect of the disclosure, an edge milling cutter assembly for cutting opposite edges of a workpiece has a first cutting assembly; a second cutting assembly positioned a predetermined distance from the first cutting assembly; a first guide roll assembly positioned in front of the first cutting assembly; a second guide roll assembly positioned in front of the second cutting assembly; wherein the first guide roll assembly and the second guide roll assembly are movable in relation to each other in equal amounts; and a mechanism which engages the first guide roll assembly and the second guide roll assembly to facilitate the equal travel of the first and second guide rolls.

A method for milling opposite edges of a workpiece includes: providing a pair of opposed guide rolls for guiding and aligning a workpiece for cutting; feeding the workpiece past the guide rolls such that opposite edges of the workpiece engage the guide rolls; providing a means for moving the guide rolls an equal distance to accommodate the workpiece; providing a pair of opposed cutting heads for cutting opposite sides of the workpiece; feeding the workpiece past the opposed cutting heads; and cutting equal amounts of material from opposite sides of the workpiece with the opposed cutting heads.

Another aspect of the disclosure is that the milling device mills edges on opposite sides of a scalp, or metal strip to be formed and welded into pipe or tubing.

Another aspect of the disclosure is a pair of movable cutting heads which are stationary in a vertical direction but move laterally to cut equal amounts from opposite sides of the strip.

Another aspect of the invention is the edges of the metal sheet are milled to result in a precise width. The edges are milled at an angle such that the welding after forming of the tube is enhanced.

Still another aspect of the disclosure is the milled edge locations are positioned such that an equal amount of material width is removed by milling from each edge of the metal strip, even if the metal strip floats as it passes through the molding device.

Yet another aspect of the disclosure are guide rolls which move into contact with the metal sheet to align and guide the sheet to be cut in equal amounts on opposite sides by cutting heads.

Still other aspects of the disclosure will become apparent upon a reading of the following detailed description.

BRIEF DESCRIPTION OF THE DRAWINGS

FIGS. 3A-3C are views taken through lines 3A-3A, 3B and 3C of FIG. 3;

FIG. 3D is an enlarged view of a gear rack assembly of FIG. 3;

DETAILED DESCRIPTION OF THE DISCLOSURE

The present disclosure relates to milling or cutting edges of metal plate. More particularly, it relates to an edge milling device which mills edges an equal amount on both sides of a workpiece to be formed and welded into pipe or tubing. Metals or other materials can be utilized to form the workpiece. The workpiece can be a scalp, or a metal strip or plate.

Figure 1:
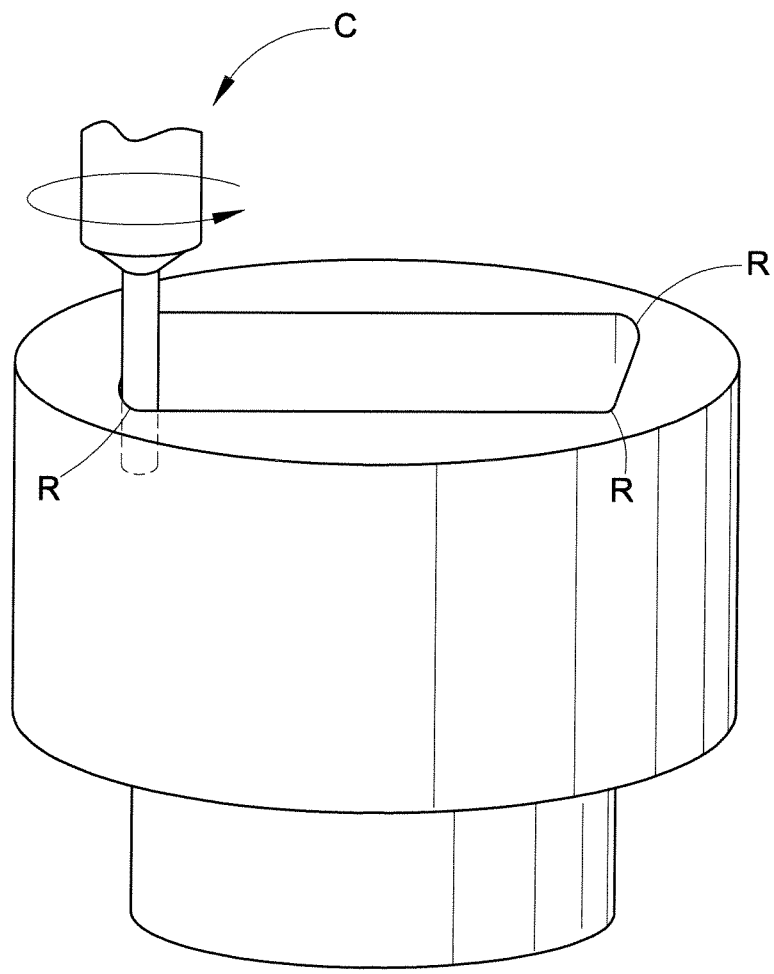
FIG. 1 illustrates an existing edge milling cutter.
Figure 2:
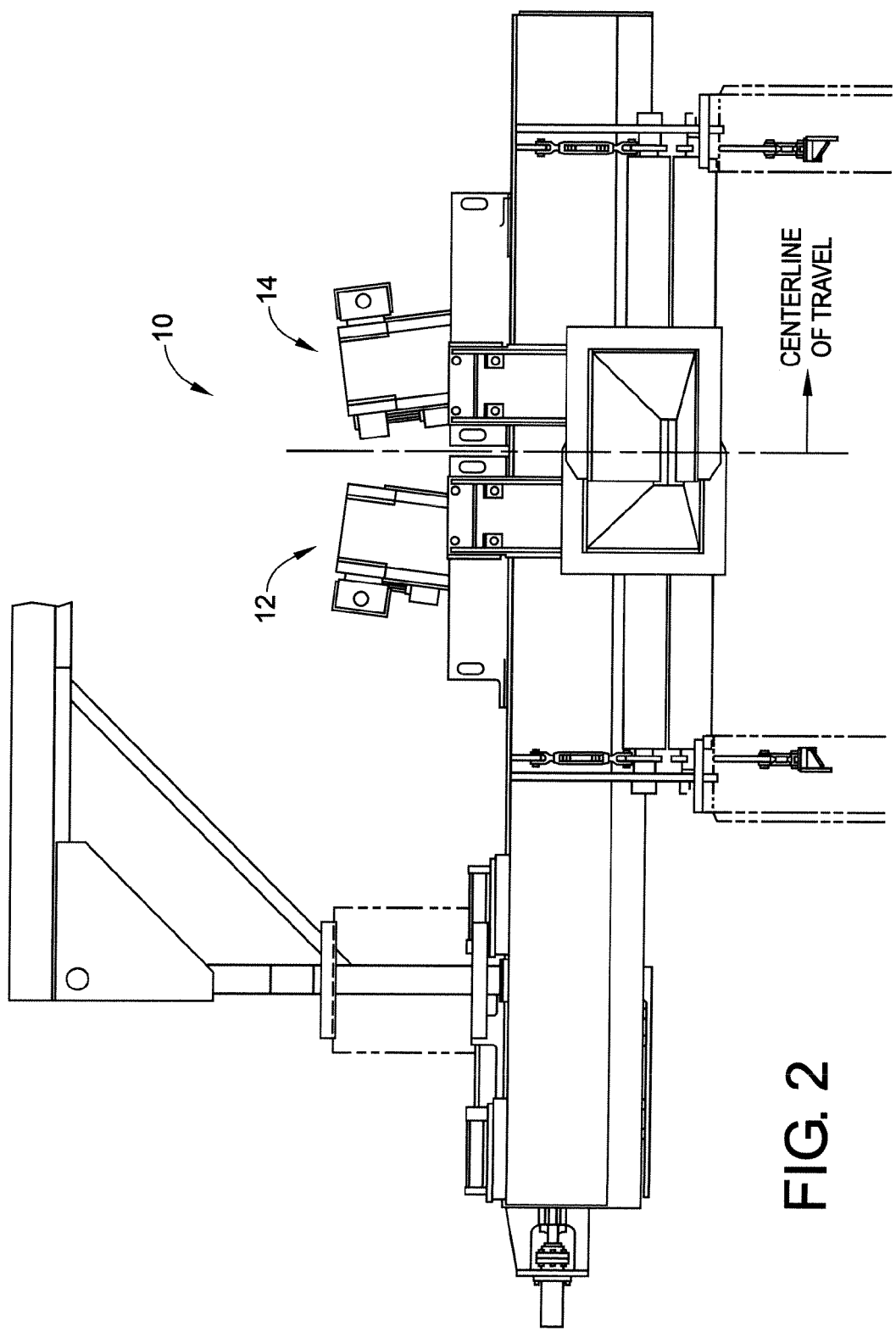
FIG. 2 is a side elevational view of an edge milling cutter assembly according to the present disclosure.
Figure 3:
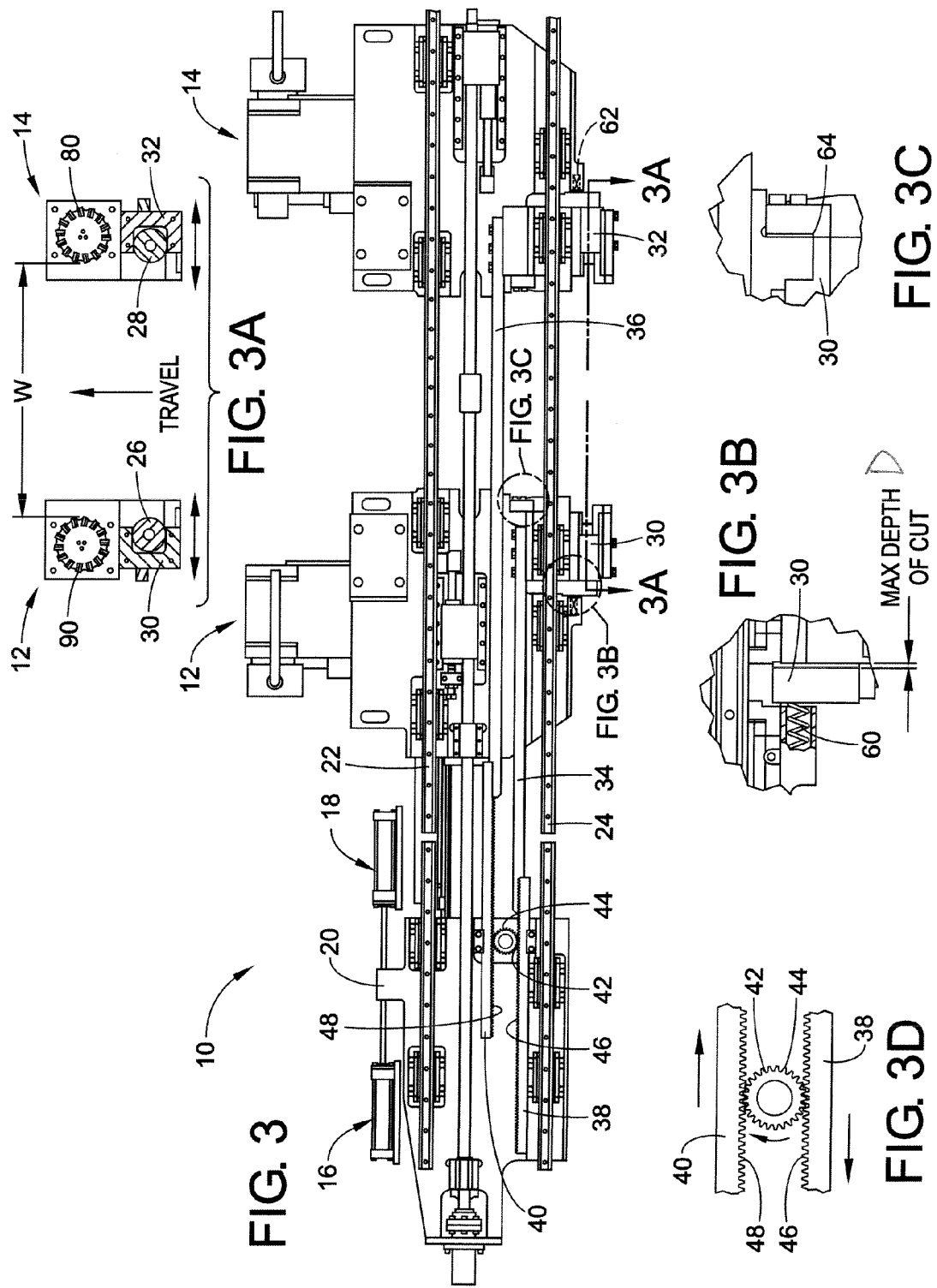
FIG. 3 is a side elevational view of the edge milling cutter of FIG. 2.

FIGS. 2 and 3 illustrate the general arrangement of the milling cutter system 10, in accordance with a preferred embodiment of the present disclosure. The system includes a left hand milling cutter head 12 and a right hand milling cutter head 14. Two air cylinders 16 and 18 are fixed to a stationary base 20. The entire system 10 including the base 20 can shift left to right to accommodate float of the workpiece. The cylinders 16, 18 are used to move the assembly back to a centered position. A pair of linear guide rails 22, 24 extend in a lateral direction from the stationary base and between cutting heads 12 and 14. A pair of cam rolls 26, 28 are provided in brackets 30, 32, which are positioned forwardly of the cutting heads 12, 14 (see FIG. 3A). During operation, the strip of material is fed up to and then between the camrolls. The material widths will typically be greater than the spacing between the camrolls. To accommodate the wider strips, the camrolls are moved laterally outwardly away from each other by the opposite edges of the strip. Camroll bracket 30 is attached to an elongated arm 34 extending therefrom which is fastened to elongated lower gear rack 38 by fasteners (not shown). Similarly, camroll bracket 32 is attached to an elongated arm 36 extending therefrom which is fastened to an elongated upper gear rack 40 by fasteners (not shown).

A single gear 42 is interposed between gear racks 38, 40 and has teeth 44 which interengage mating teeth 46, 48 of the opposed racks 38, 40. Lower teeth 46 of rack 38 force upper teeth 48 of rack 40 as seen in FIG. 3.

Because the gear racks both interengage the same gear, as the camrolls are moved by the edges of the strip, both gear racks move and the gear 42 rotates, then both camrolls move the same amount in opposite directions. For example, assuming the strip of material is wider than the distance between the camrolls 26, 28, camroll 26 is moved to the left in FIG. 3A and camroll 28 is moved to the right in FIG. 3A, thus moving lower gear rack 38 to the left and upper gear rack 40 to the right, moving the gear 42 in a clockwise direction as shown in FIG. 3D. The camrolls move away from each other, creating a larger gap between them. Similarly, if camroll 26 were to move to the right, and camroll 28 were to move to the left, upper gear rack 40 would move to the left and lower gear rack 38 would move to the right, thus rotating the gear 42 counterclockwise. The camrolls would then move toward each other creating a smaller gap between them.

Referring to FIG. 3C, a shim 64 can be used to retain the camroll bracket such that the camroll is in line with the cutter (0.000" depth of cut) position when no material is present in the edge milling cutter. The depth of cut is set by the position of the camrolls.

The edge miller is configured to mill a bevel on two opposing edges of a piece of sheet metal or strip. This prepares the sheet or strip for the process of rolling the strip into a tube and welding the two milled edges together. It is essential to a successful weld to machine both edges precisely. To ensure that the edge miller always removes the same quantity of material from both edges of the strip, the edge milling cutter automatically adjusts a set of guide or camrolls which are located in front of the cutters to ensure that both edges of the material have an equal amount of material removed.

For example, an incoming strip material width is 38.050 inches and a desired material width is 38.000 inches. The edge miller width W between cutter heads 80 and 90 is set to 38.000 inches (see FIG. 3A).

The material is fed until it approaches the camrolls. The width between the camrolls is initially equal to the width W between the cutting heads. The material is 0.050 inches wider than the width between camrolls. As a result, the camrolls 26, 28 are moved or pushed laterally outwardly away from each other by the opposed edges of the material, which in turn moves the gear racks 38, 40 attached to the camroll brackets to the left and right, respectively, and rotates gear 42 clockwise (see FIG. 3D). Since both of the gear racks 38, 40 engage the same gear 42, the camrolls are automatically moved the same distance, in opposite directions away from each other. Thus, any float in the strip material is accommodated by the adjustable movement of the guide camrolls. Moreover, if necessary, the entire assembly 10 can be adjusted laterally to also accommodate float of the material.

The material then travels further along the travel path (see FIG. 3A) toward the two cutting heads 80, 90, where each cutting head then removes 0.025 inches of material from each edge of the strip or sheet, thereby reducing the width W of the material to the desired 38.000 inches.

Referring now to FIGS. 3 and 3B, springs 60, 62 bias the camroll brackets 30, 32 and the camrolls 26, 28 into contact with opposite sides of the strip being fed past the camrolls. A maximum allowable depth D of a cut is shown in FIG. 3B, which is formed by the amount of travel of the camroll between its biased position in line with the cutting heads to a position corresponding to the maximum amount of material thickness to be removed from the strip. In other words, the strip of metal sets the maximum amount of travel of the camrolls. The spring biases the camrolls toward each other to the same initial or starting position as the cutting heads. That is, the distance or width between the camrolls is the same as the distance or width W between the cutting heads before any material is fed through for cutting. Also, the distance between the camrolls cannot be less than the distance between the cutting heads. The opposed edges of the strip can push the camrolls in opposite directions away from each other, thus compressing the springs and increasing the distance between the opposed camrolls. The range of movement of the camrolls can vary from no or zero movement to movement corresponding to the maximum amount of material to be milled off of the edges of the strip, as much as 0.100 to 0.200 inches per side or more. That is, each camroll can move as much as 0.100 to 0.200 inches or more from a starting position to accommodate the width of the strip.

The material continues to move toward the cutters until the material passes between the cutter heads 80, 90 wherein each head removes the same amount of material from opposite edges of the strip, since the strip is centrally aligned between the cutting heads due to the equal shifting of the camrolls, thus aligning the strip so it can be cut to the desired width.

Figure 4:
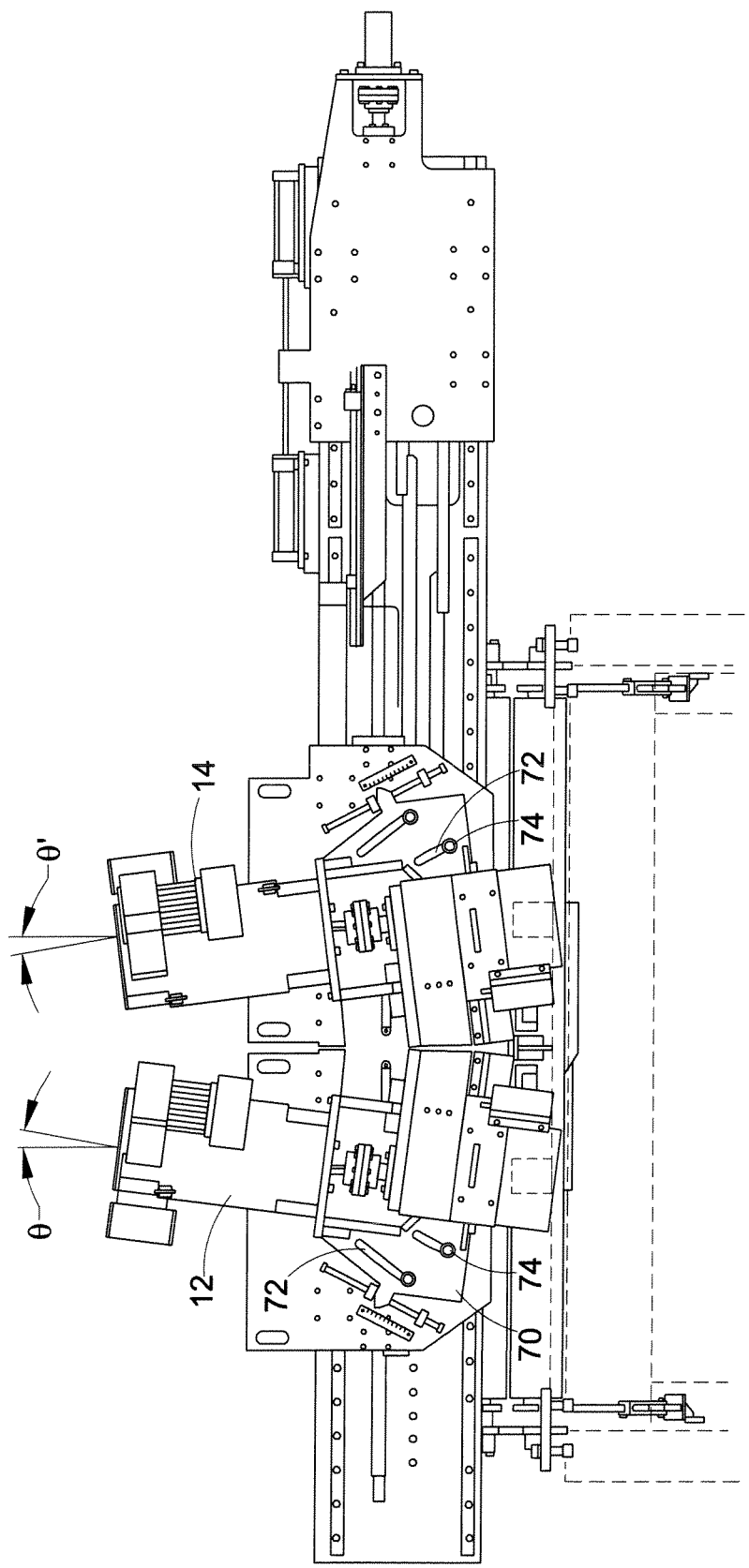
FIG. 4 is a side elevational view illustrating left hand and right hand edge milling cutters at an angle with respect to each other.
Figure 5:
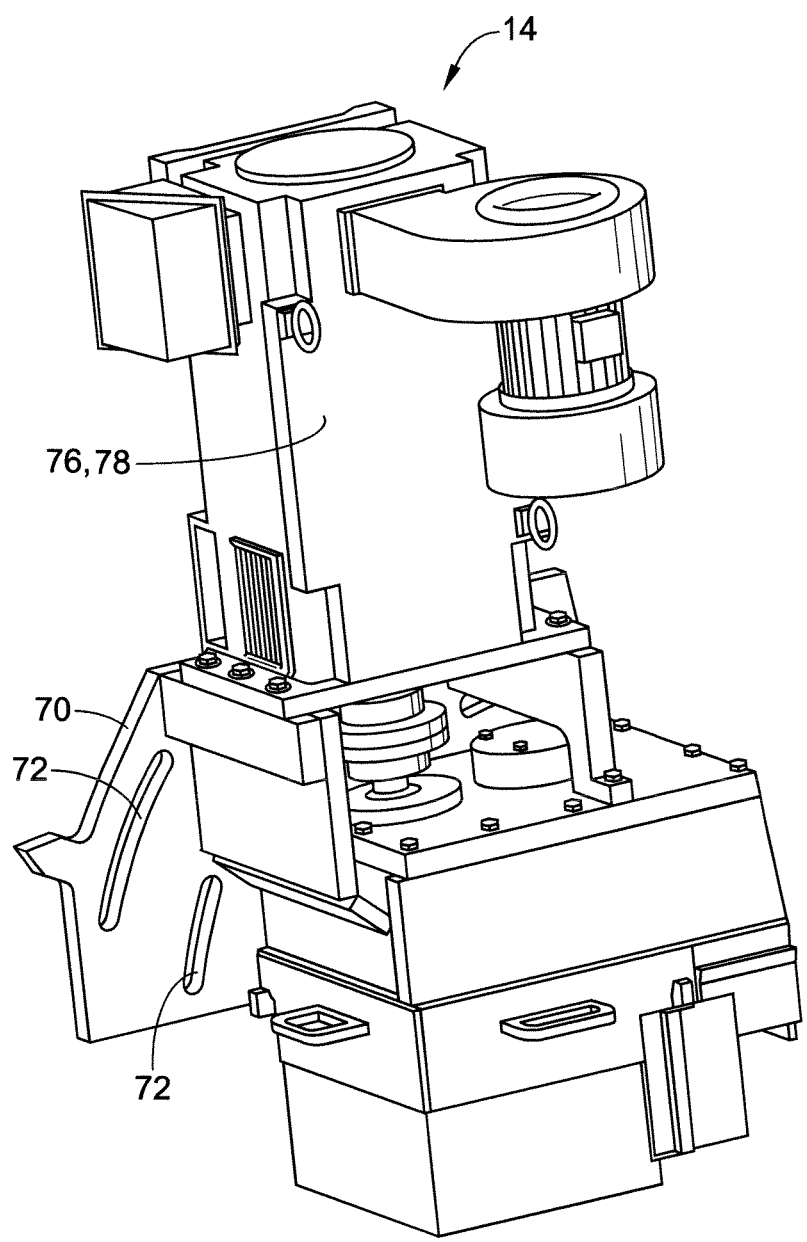
FIG. 5 is a perspective view of the right hand cutter of FIG. 4.
Figure 6:
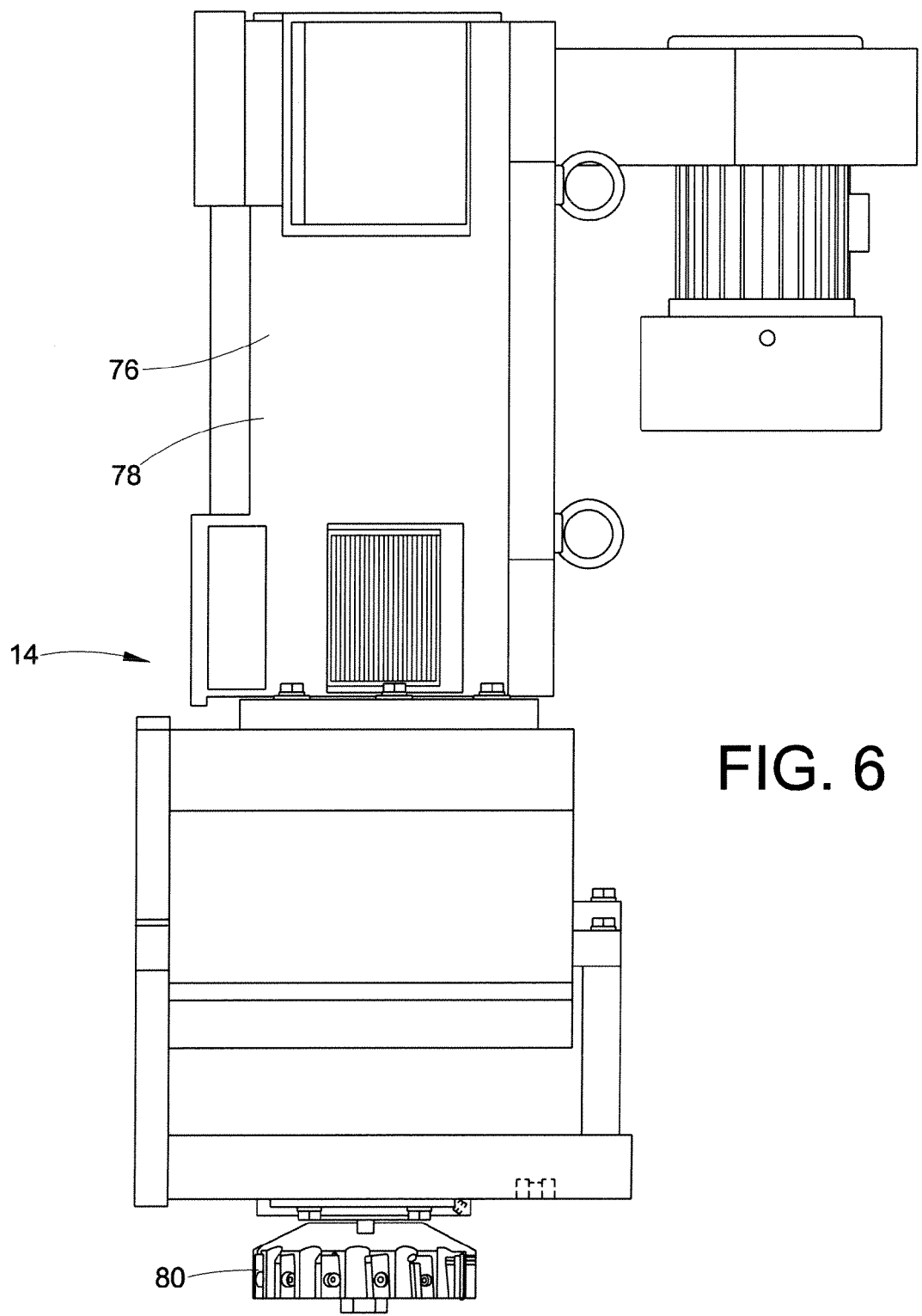
FIG. 6 is a side elevational view of the cutter of FIG. 5.

Referring now to FIG. 4, the cutting head assemblies 12, 14 can be positioned at an angle with respect to one another and with respect to vertical such that the opposite edges of a metal sheet are milled to enhance welding of the sheet into a tube after milling is performed. The angles (such as θ, θ') can be of various degrees to accommodate different configurations of workpieces from 0 degrees from vertical to about 10 to 12 degrees from vertical. Referring now to FIGS. 5 and 6, each cutting head has a plate 70 with several curved elongated slots 72 which facilitate rotation or pivoting of the cutting head and engage pins or fasteners 74 which may aid in rotating and securing the head in a specific rotated position. The width between the head remains unchanged even when the heads are rotated. An AC motor assembly 76 is positioned in a housing 78 above the cutting head 80 which is energized to rotate the head. The cutters pivot about the center of cutting action; that is, the instant center formed at the edge of the cutters.

Figure 7:
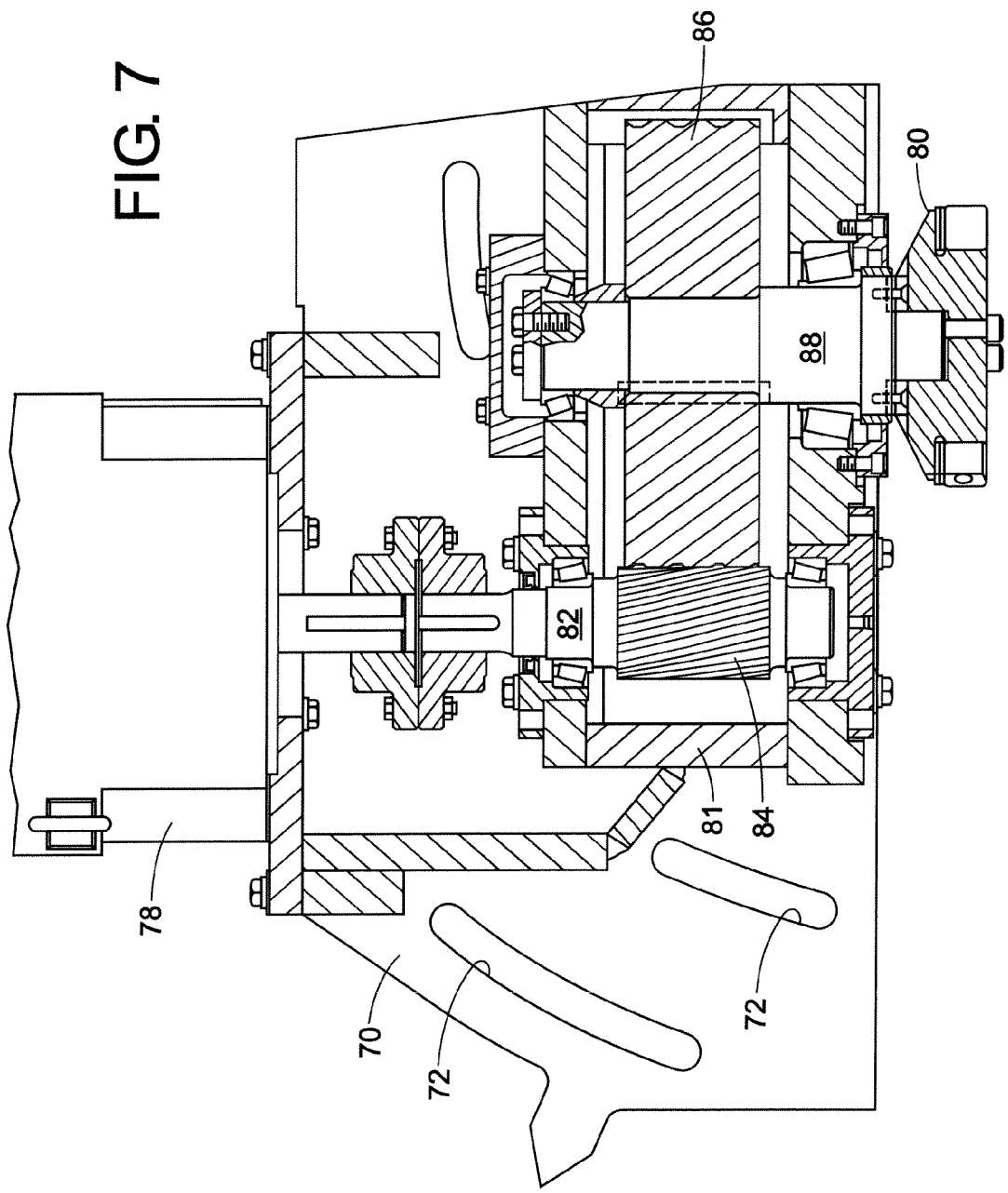
FIG. 7 is a cross-sectional side elevational view of the cutter of FIG. 6.
Figure 8:
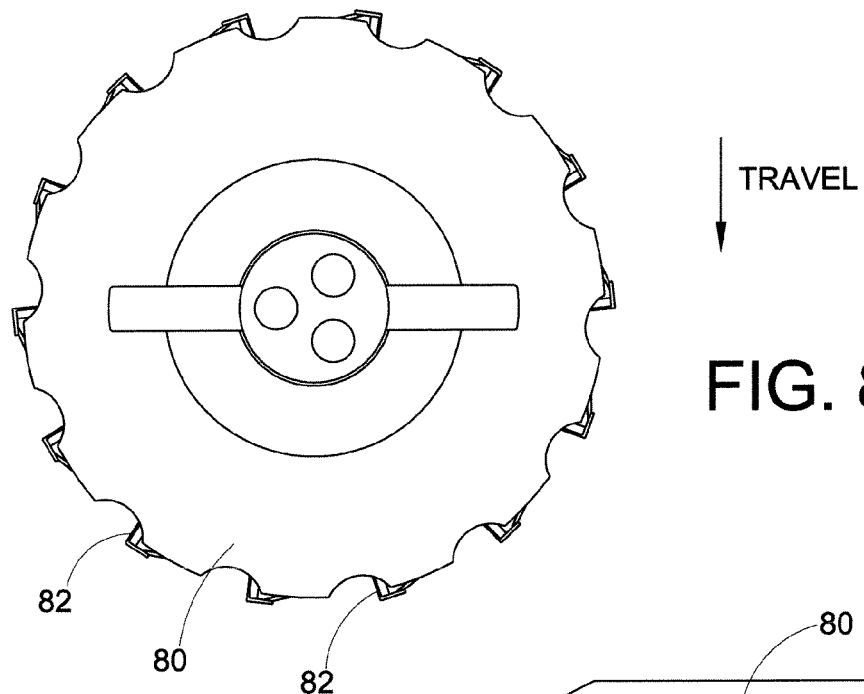
FIGS. 8-10 are a top plan view, side elevational view and a bottom plan view of a right hand cutting head of the present disclosure.
Figure 9:
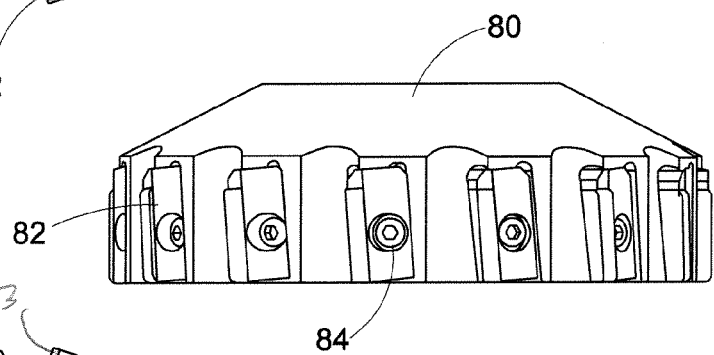
Figure 10:
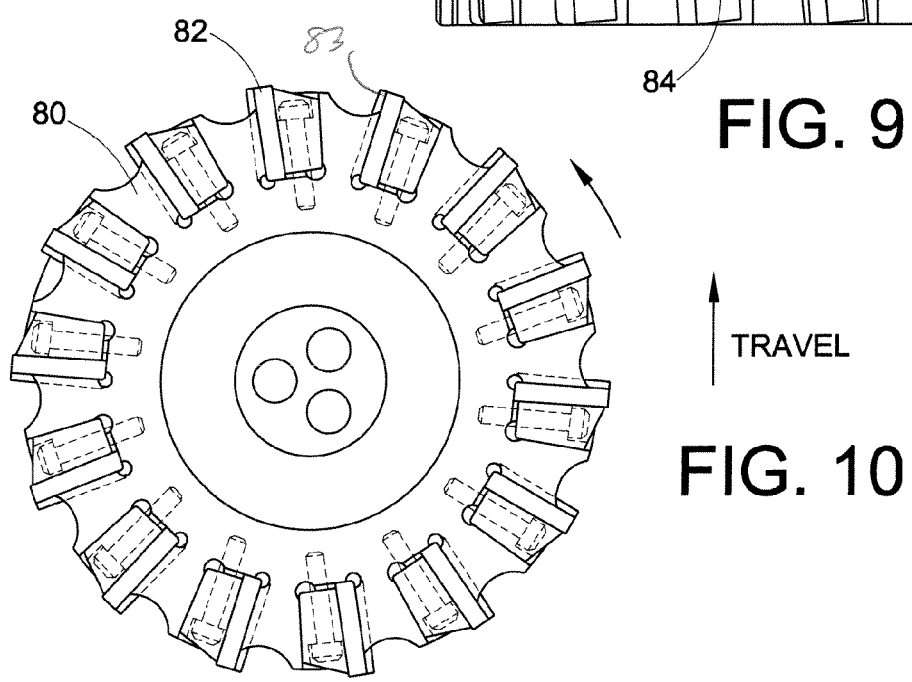
Figure 11:
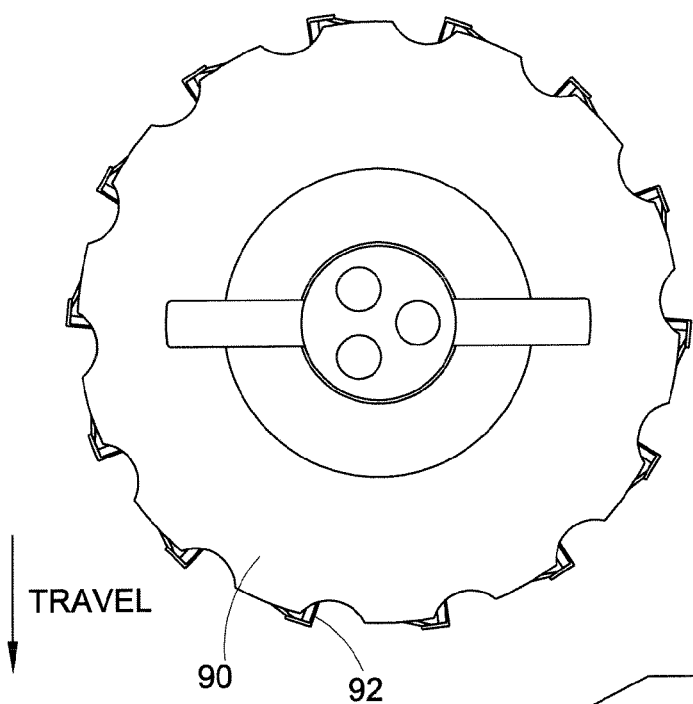
FIGS. 11-13 are a top plan view, side elevational view and a bottom plan view of a left hand cutting head of the present disclosure.
Figure 12:
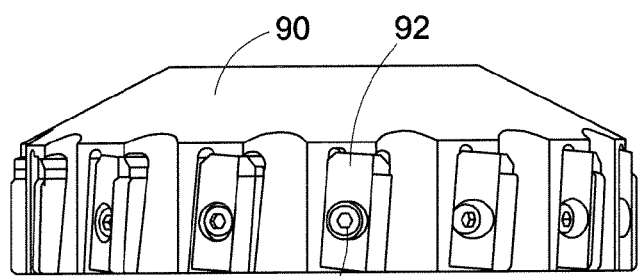
Figure 13:
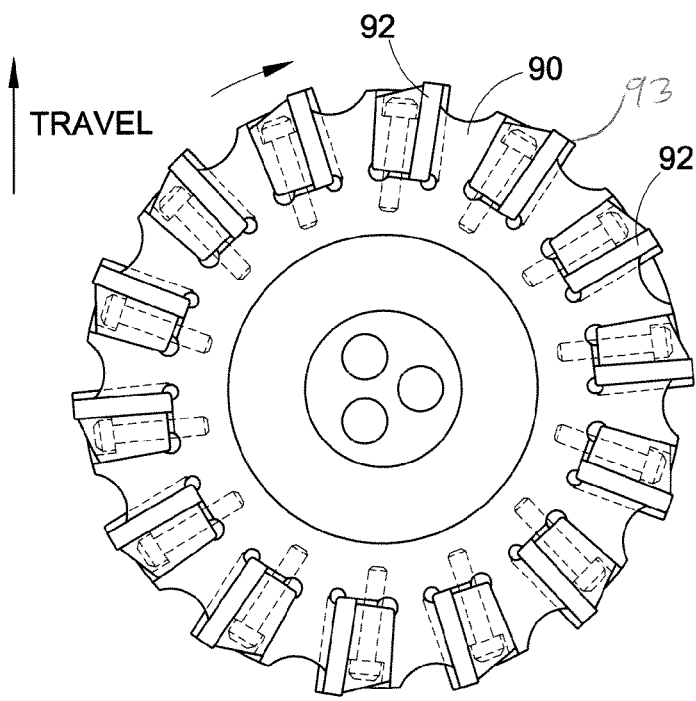

Referring now to FIG. 7, a shaft 82 extending from the motor housing into cutting head housing 81 has a helical gear box including a first gear 84 which engages a mating second gear 86 surrounding a shaft 88 connected to the cutting head 80. As the shaft 82 is rotated by activating the motor, the gear 84 interengages and in turn rotates the gear 86 which in turn rotates the cutting head.

Referring to FIGS. 8-10 and 11-13, the milling or cutting head of the present disclosure includes a first or right hand cutting head 80 utilized to remove a predetermined amount of material from an edge of the sheet and a second or left hand cutting head 90 to remove a predetermined amount of material from an opposite edge of the sheet.

Each of the movable cutting heads 80, 90 is stationary in a vertical orientation but can be moved laterally to accommodate various desired widths of the strips or workpieces. Up to about $1/1,000^{th}$ (0.001) of an inch cutting accuracy can be achieved. Typically, about 0.010 to 0.050 inches of material or more is removed from both sides of the strip. Strips of material ranging from less than 6 inches to 60 inches or more in width can be accommodated. That is, the distance between the cutting heads (width W in FIG. 3A) can range from up to about 6 inches to 60 inches or more.

Each cutting head 80, 90 includes cutting inserts 82, 92 having cutting edges or surfaces 83, 93, such as generally a blade or other honed edge which is adapted to remove material such as by cutting, abrading, grinding, or the like from an edge of a workpiece. The inserts 82, 92 are secured to the heads by fasteners 84, 94 equally spaced around the periphery of the heads. However, other configurations of cutting inserts can also be used.

The edge miller is configured to mill a bevel an equal amount on two opposing edges of a piece of sheet metal or strip. That is, the cutting heads can be tilted or rotated to appropriate angles to facilitate welding of the edges together to form a pipe. This prepares the sheet or strip for the process of rolling the strip into a tube and welding the two milled edges together. Machining both edges precisely assures a successful welding of the edges together to form a pipe or tube. To ensure that the edge miller always removes the same quantity of material from both edges of the strip, the edge milling cutter automatically adjusts a set of guide or camrolls which are located in front of the cutters to ensure that both edges of the material have an equal amount of material removed.

The exemplary embodiment has been described with reference to the preferred embodiment. Obviously, modifications and alterations will occur to others upon reading and understanding the preceding detailed description. It is intended that the exemplary embodiment be construed as including all such modifications and alterations insofar as they come within the scope of the above description.

The invention claimed is:

1. An edge milling cutting assembly for cutting opposite edges of a workpiece, comprising:
   a first cutting assembly comprising a first cutting head;
   a second cutting assembly comprising a second cutting head positioned a predetermined distance from said first cutting assembly, said first cutting assembly is positioned at a first angle with respect to a vertical axis of said assembly and said second cutting assembly is positioned at a second angle with respect to said vertical axis of said assembly;
   wherein said first cutting head and said second cutting head each removes the same amount of material from opposite edges of said workpiece as said workpiece is fed through said edge milling cutting assembly between said first cutting head and said second cutting head; and
   wherein each of said first and said second cutting heads comprises cutting inserts forming separate cutting edges spaced along an outer perimeter of said first and second cutting heads;
   a first guide roll assembly positioned in front of said first cutting assembly;
   a second guide roll assembly positioned in front of said second cutting assembly;
   wherein said first guide roll assembly and said second guide roll assembly are movable in relation to each other; and
   a mechanism which engages said first guide roll assembly and said second guide roll assembly.

2. The edge milling cutting assembly of claim 1, wherein said first guide roll comprises a first camroll and a first bracket containing said first camroll and said second guide roll assembly comprises a second camroll and a second bracket containing said second camroll.

3. The edge milling cutting assembly of claim 2, wherein said mechanism comprises a gear which interengages first and second gear racks attached to said first and second brackets of said first guide roll assembly and said second guide roll assembly.

4. The edge milling cutting assembly of claim 3, wherein said first gear rack is positioned on a first side of said gear and said second gear rack is positioned on an opposite second side of said gear.

5. The edge milling cutting assembly of claim 4, wherein said gear comprises a plurality of teeth which interengage a plurality of teeth of each of said first and second gear racks.

6. The edge milling cutting assembly of claim 5, wherein when said first guide roll and said second guide roll are contacted by edges of a workpiece, said first guide roll and said second guide roll move away from each other, and said first and second gear racks move in opposite directions and said gear rotates clockwise.

7. The edge milling cutting assembly of claim 6, wherein when said first guide roll and said second guide roll move toward each other, said gear racks move in opposite directions and said gear rotates counterclockwise.

8. The edge milling cutting assembly of claim 7, wherein said first camroll bracket and said second camroll bracket are each spring biased to maintain contact with said workpiece as it travels through said edge milling cutter assembly.

9. The edge milling cutting assembly of claim 7, wherein when said gear is rotated, said first guide roll and said second guide roll are moved equal distances toward or away from each other.

10. The edge milling cutting assembly of claim 9, wherein said first and second camroll brackets are positioned such that said first camroll is aligned with said first cutting head and said second camroll is aligned with said second cutting head prior to feeding a workpiece through the said cutting assembly.

11. The edge milling cutting assembly of claim 1, wherein said first cutting assembly and said second cutting assembly each comprises a slotted member comprising a plate having slotted openings which allows said first cutting assembly and said second cutting assembly to rotate toward or away from each other.

12. The edge milling cutting assembly of claim 11, wherein each of said first and second cutting assemblies comprises a first shaft connected to a motor and a second shaft connected to one of said first and second cutting heads.

13. The edge milling cutting assembly of claim 12, wherein each of said first and second cutting assemblies comprises a gear assembly comprising a first gear attached to said first shaft and a second gear attached to said second shaft, wherein said first gear matingly interengages said second gear.

14. The edge milling cutting assembly of claim 1, wherein said cutting inserts are removably mounted to said first and second cutting heads via fasteners.

15. A method for milling opposite edges of a workpiece, comprising:
- providing a pair of opposed guide rolls for guiding and aligning said workpiece for cutting;
- feeding said workpiece past said guide rolls such that opposite edges of said workpiece engage said guide rolls;
- providing a means for moving said guide rolls an equal distance to accommodate said workpiece;
- providing a pair of opposed left hand and right hand cutting heads for cutting opposite sides of said workpiece, said left hand and right hand cutting heads are oriented at an angle with respect to each other;
- wherein each of said left hand and said right hand cutting heads comprises cutting inserts forming separate cutting edges spaced along an outer perimeter of said first and second cutting heads;
- aligning said workpiece centrally between the opposed cutting heads via said guide rolls;
- feeding said workpiece past said opposed cutting heads; and,
- cutting equal amounts of material from opposite sides of said workpiece with said opposed cutting heads.

* * * * *